Feb. 8, 1927.
W. V. JOHNSON
1,616,578
MINE CAR
Original Filed March 9, 1925
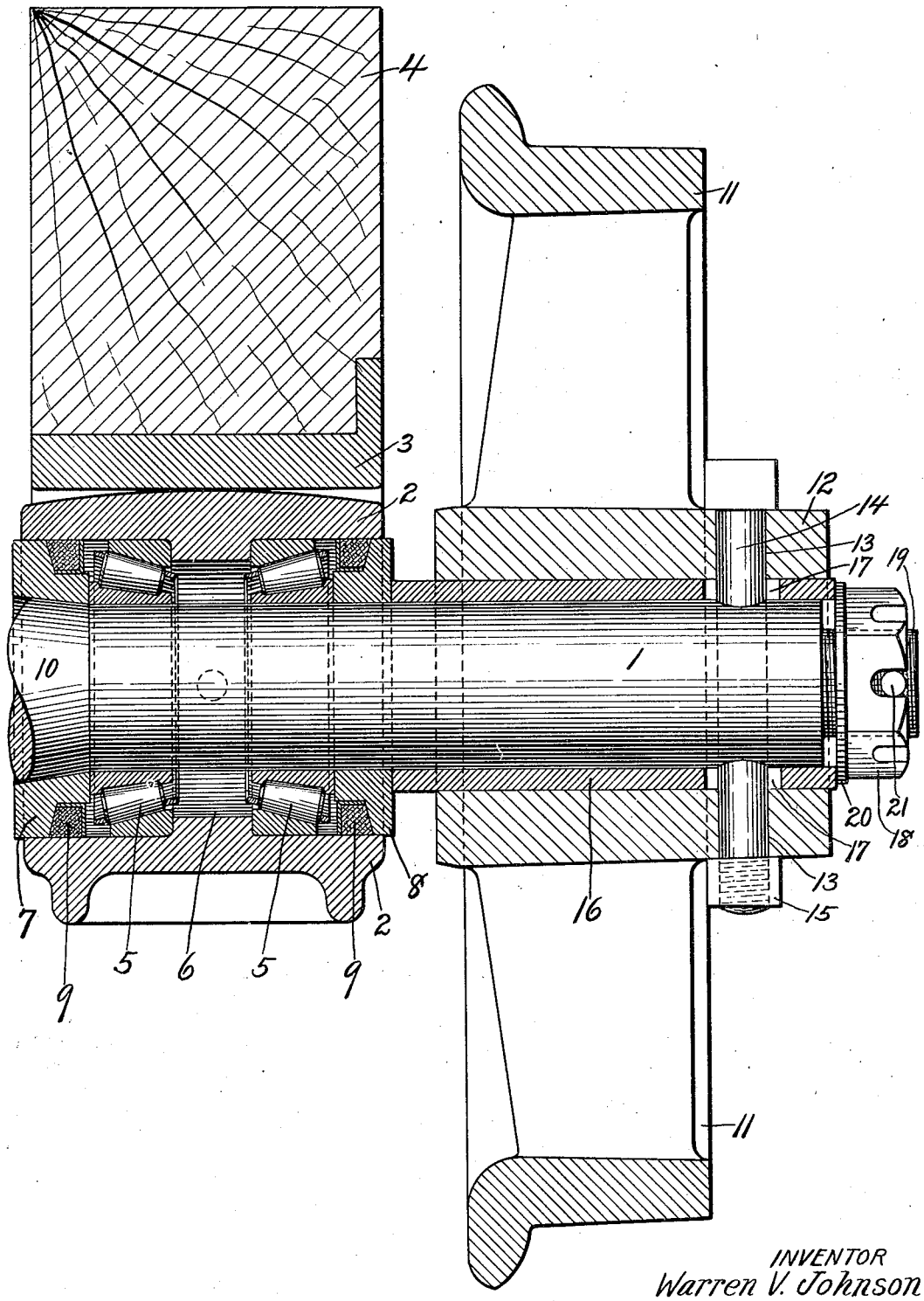
INVENTOR
Warren V. Johnson
BY
ATTORNEY Patented Feb. 8, 1927.

1,616,578

UNITED STATES PATENT OFFICE.

WARREN V. JOHNSON, OF BLOOMSBURG, PENNSYLVANIA, ASSIGNOR TO AMERICAN CAR AND FOUNDRY COMPANY, OF NEW YORK, N. Y., A CORPORATION OF NEW JERSEY.

MINE CAR.

Continuation of application Serial No. 14,142, filed March 9, 1925. This application filed July 15, 1925. Serial No. 43,774.

In the drawings:

The figure is a vertical sectional view showing a car wheel and axle bearing with the improved bearing tightening means in place.

This application is a continuation of application, Serial No. 14,142, filed March 9, 1925, and one object of the invention described herein is to provide a bearing adjusting means which may be operated to tighten the bearing without it being necessary to remove a car wheel from the axle.

Another object of this invention is to provide a bearing adjusting means which will permit of a car wheel being removed from its axle without interfering with the adjustment of the bearing of the axle. Another object is to provide a bearing adjusting means of the type described so constructed that at the limits of its movement ample clearance is provided between the wheel hub and the journal box and bearing. In mine cars of the type shown the wheels are mounted upon the axles in such a manner that they are disposed outwardly beyond the journal boxes and with the structures now in use in mine cars it has been found difficult to adjust a so-called Timken bearing to compensate for wear as it is necessary to remove the wheels before the bearings can be adjusted. By having the wheels mounted in accordance with this invention the bearings can be adjusted without removing the wheels thereby saving a great deal of time and trouble. This improved construction also permits the wheels to be fastened to the axles so that the wheels and axles turn together and permits the wheels to be removed from the axles without disturbing the bearing adjusting means.

In the illustration only one wheel has been shown together with an end portion of an axle but it will be understood that a similar construction will be provided at each end of the axle. This axle 1 extends transversely of the mine car and projects through a bearing or journal box 2 which is disposed beneath a shoe 3 secured to the under face of the side sill 4 of a car body. This bearing or journal box 2 is of a conventional construction and carries roller bearings 5 which are also of a conventional construction and disposed upon opposite sides of the annular rib 6 in the journal box. Collars 7 and 8 are disposed at the inner and outer ends of the journal box, the collars being provided with packing 9 for retaining a lubricant in the journal box. The inner collar 7 fits upon a tapered portion 10 of the axle 1 whereas the collar 8 is disposed about the spindle-form portion of the axle. It will be obvious that when it is desired to adjust the bearings to compensate for wear it is simply necessary to force the collar 8 inwardly towards the collar 7, whereupon the roller bearing assembly will be moved to take up wear or to proper operative relation.

The wheel 11 is disposed upon the extended outer end portion of the axle and has its hub portion 12 extended outwardly beyond the spokes and rim and this extended outer end portion of the hub is pierced transversely with alined openings 13 so that a transverse wheel-securing bolt 14 may be passed through the hub and through a transversely disposed opening provided in the axle. This bolt is provided with a securing nut 15 which when tightened will securely hold the bolt in place. It will therefore be seen that when the bolt is put in place and the nut secured the wheel and the axle will turn together. Therefore when the car is in use and moving along a track the axle will rotate in roller bearings and will be permitted to turn easily.

It is desirable to permit the bearings to be adjusted when they have become worn and in order to do so there has been provided a sleeve 16 which extends through and beyond the hub of the wheel at each end and fits snugly upon the extended end portion of the axle, with its inner end in contact with the collar 8. The sleeve 16 is of greater length than the hub of the wheel and its end portions extend beyond the ends of the hub when necessary. Openings 17 are provided in the sleeve to receive the bolt 14 and these openings 17 are elongated longitudinally of the sleeve so that the sleeve may be moved longitudinally of the axle. The length of the sleeve 16 is sufficient, however, to provide ample clearance between the wheel hub 12 and the journal box 2 and collar 8 when the sleeve 16 is in its outermost position, that is, upon the application of a new or unworn bearing. A nut 18 is screwed upon the reduced and threaded outer end portion 19 of the axle and engages with or is formed with a washer 20 which is of such size that it will engage with the outer end of the sleeve 16 but whose diameter is less than the diameter of the bore of the wheel so that the wheel 11 may be removed from the sleeve 16 or replaced thereon without disturbing the nut 18 and washer 20 or the adjustment of the bearing. By adjusting this nut properly pressure will be applied to force the sleeve inwardly through the hub of the wheel and its inner end will force the outer collar 8 inwardly towards the inner collar 7 and cause the desired adjustment of the bearings. After the bearings have been adjusted the desired amount the cotter pin 21 will be put in place and the adjusting nut will be held in the proper position holding the collar 8 in adjusted position. When the bearings have become worn so that they need adjusting it is simply necessary to remove the cotter pin and the nut 18 can be moved to again move the sleeve inwardly and cause further adjustment of the bearings. It will thus be seen that with this construction the bearings can be adjusted without it being necessary to remove the wheel.

What is claimed is:

1. In a structure of the character described, a journal-bearing, an axle extending through the journal-bearing and rotatable therein, anti-friction means in said journal-bearing about said axle, a wheel disposed about a portion of the axle extending from said journal-bearing and rotating with the axle, and means for adjusting the anti-friction means through the hub of said wheel.

2. In a structure of the character described, a journal-bearing, an axle extending through the journal-bearing and rotatable therein, anti-friction means in said journal-bearing about said axle, a wheel disposed on the axle extending from said journal-bearing and rotating with the axle, and means extending through the hub of the wheel about the axle for adjusting the anti-friction means.

3. In a structure of the character described, a journal-bearing, an axle extending through the journal-bearing and rotatable therein, anti-friction means in said journal-bearing about said axle, a wheel disposed on the axle extending from said journal-bearing and rotating with the axle, a sleeve extending through the hub of the wheel about the axle and movable longitudinally of the axle, and means for moving said sleeve longitudinally of the axle and causing tightening of the anti-friction means.

4. In a structure of the character described, a journal-bearing, an axle extending through the journal-bearing and rotatable therein, anti-friction means in said journal-bearing about said axle, a wheel on the axle extending from said journal-bearing and rotating with the axle, a sleeve extending through the hub of the wheel about the axle and movable longitudinally of the axle, and a nut screwed upon an extended end portion of said axle beyond said wheel and when tightened causing said sleeve to be moved through the hub of the wheel to tighten said anti-friction means.

5. In a structure of the character described, a journal-bearing, an axle extending through the journal-bearing and rotatable therein, anti-friction means in said journal-bearing about said axle, a wheel on a portion of the axle extending from said journal, a sleeve extending through the hub of the wheel about the axle, said axle and the wheel hub having alined transversely disposed openings and the sleeve having longitudinally disposed slots, a securing bolt extending through the openings and slots to cause turning of the wheel and sleeve with the axle and permit limited independent longitudinal movement of the sleeve longitudinally of the axle to tighten said anti-friction means.

6. In a structure of the character described, the combination with a portion of a car body, of a journal-bearing connected therewith, a rotary axle extending through the journal-bearing and outwardly beyond the same, anti-friction means in the journal-bearing for the axle, a wheel upon the extended outer portion of said axle and rotating with the same, and means operable through the hub of said wheel and adapted to tighten said anti-friction means without removing said wheel.

7. In a structure of the character described, the combination with a side sill of a car body, of a journal-box secured to said sill, a rotary axle extending through and outwardly beyond said journal-box, anti-friction means for said axle in said journal-box, a wheel upon the extended outer end portion of said axle and rotating with the same, and means movable longitudinally through the hub of the wheel for tightening the anti-friction means without removing said wheel.

8. In a structure of the character described, the combination with a portion of a car body, of a journal-box connected therewith, a rotary axle extending through the journal-box and outwardly beyond the same, anti-friction means in the journal-box for the axle, a wheel upon the extended outer end portion of said axle, a sleeve extending through the hub of the wheel about the axle, means causing rotation of the sleeve and axle with the wheel, said sleeve being movable longitudinally of the axle, and means for moving said sleeve longitudinally of the axle and causing tightening of said anti-friction means.

9. In a structure of the character described, the combination with a portion of a car body, of a journal-box connected therewith, a rotary axle extending through the journal-box and outwardly beyond the same; anti-friction means in the journal-box for the axle, a wheel upon the extended outer end portion of said axle, a sleeve extending through the hub of the wheel about the axle, means causing rotation of the sleeve and axle with the wheel, said sleeve being movable longitudinally of the axle, and means adjustably mounted upon the axle outwardly of the wheel for engaging the outer end of said sleeve and moving the sleeve longitudinally of the axle for tightening said anti-friction means.

10. A bearing-adjusting wheel attachment for a bearing-mounted axle, said attachment comprising a bored wheel hub perforated transversely to take securing means for securing the wheel to such axle; and a sleeve, for adjusting the axle bearing, slidable longitudinally of the hub bore and provided with elongated openings in coincidence with the perforations in the hub, so as to permit relative movement of said sleeve and one of the other parts even with the securing means in place.

11. A bearing-adjusting wheel attachment for a bearing-mounted axle, said attachment comprising a bored wheel hub perforated transversely to take securing means for securing the wheel to such axle; and a sleeve longer than said hub, for adjusting the axle bearing, slidable longitudinally of the hub bore and provided with elongated openings in coincidence with the perforations in the hub, so as to permit movement of said sleeve even with the securing means in place.

12. A bearing-adjusting wheel attachment for a bearing-mounted axle, said attachment comprising a bored wheel hub perforated transversely to take securing means for securing the wheel to such axle; and a sleeve longer than said hub and normally projecting therebeyond, for adjusting the axle bearing, slidable longitudinally of the hub bore and provided with elongated openings in coincidence with the perforations in the hub, so as to permit relative movement of said sleeve and one of the other parts even with the securing means in place.

13. In combination, a wheel having a hub, a sleeve in said hub, the hub and sleeve having alined openings to take securing means for securing the wheel to an axle, and the sleeve being of greater length than the axle bore of the hub, in combination with means for adjusting the sleeve on an axle without disturbing the position of said hub.

14. In combination, a wheel hub having an axle bore, a sleeve slidable in said bore and of a length greater than the axle bore of the hub, the hub and sleeve having alined openings adapted to receive a single securing means therethrough and through an axle, the openings of the sleeve being such as to permit movement of the sleeve independently of and longitudinally on an axle.

15. In combination, an axle, a sleeve thereon, a wheel on said sleeve and secured to said axle and means for adjusting said sleeve in said wheel, said wheel being removable from said sleeve independently of said sleeve adjusting means.

16. In combination, an axle, a sleeve thereon, a wheel on said sleeve and secured to said axle and means secured to said axle for adjusting said sleeve in said wheel, said wheel being removable from said sleeve independently of said sleeve adjusting means.

17. In combination, an axle, a sleeve thereon, a wheel on said sleeve and rotating with said axle and means for adjusting said sleeve in said wheel, said wheel being removable from said sleeve independently of said sleeve adjusting means.

18. In combination, a journal-bearing, an axle rotatable therein, anti-friction means for said axle in said journal-bearing, a wheel rotatable with said axle, and means for adjusting said anti-friction means through the wheel hub, said wheel being removable independently of said adjusting means.

19. In combination, a journal-bearing, an axle rotatable therein, anti-friction means for said axle in said journal-bearing, a wheel mounted on said axle and rotatable therewith, and means for adjusting said anti-friction means through the wheel hub, said wheel being removable independently of said adjusting means.

20. In combination, a journal bearing, an axle rotatable therein, anti-friction means for said axle in said journal-bearing, a sleeve on said axle, a wheel on said sleeve and rotatable with said axle and means to shift said sleeve to adjust said anti-friction means, said wheel being removable independently of said sleeve shifting means.

21. In combination, a journal bearing, an axle rotatable therein, anti-friction means for said axle in said journal-bearing, a wheel on said axle, and means for adjusting said anti-friction means through the wheel hub, said wheel being removable independently of said adjusting means.

22. A car axle bearing comprising a journal box provided with a rib, an axle extending therethrough, conical roller bearings interposed between said journal box and said axle and abutting against said rib, a sleeve on said axle, a collar on said axle between said sleeve and one of said roller bearings, a wheel mounted on said sleeve, and a bolt for securing said wheel on said sleeve and axle, said bolt extending through slots in said sleeve whereby said sleeve is permitted to be moved longitudinally to adjust said bearing.

23. A car axle bearing comprising a journal box, an axle extending therethrough, a conical roller bearing interposed between said axle and said journal box, a collar on said axle abutting against a bearing member of said roller bearing, a sleeve on said axle abutting said collar, a nut at the end of said axle for holding said sleeve in position, a wheel on said sleeve and means for securing said wheel to said axle, said means permitting longitudinal movement of said sleeve.

24. A car axle bearing comprising a journal box, an axle extending therethrough, conical roller bearings interposed between said axle and said journal box, a collar on said axle abutting against the inner bearing member of one of said roller bearings, a sleeve on said axle abutting said collar, a nut at the end of said axle for holding said sleeve in position, a wheel on said sleeve and means for securing said wheel to said axle, said means permitting longitudinal movement of said sleeve.

25. A car axle bearing comprising a journal box, an axle extending therethrough, a conical roller bearing interposed between said journal box and said axle, a sleeve on said axle, a wheel mounted on said sleeve, and a bolt for securing said wheel on said sleeve and axle, said bolt extending through slots in said sleeve.

26. A car axle bearing comprising a journal box having an annular rib therein, an axle extending therethrough, conical roller bearings interposed between said journal box and said axle and bearing against said rib, said axle having a shouldered portion, a collar seated on said axle against said shouldered portion, the inner bearing member of the inner roller bearing abutting against said collar, a sleeve on the outer end of said axle, a wheel mounted on said sleeve, a collar between said sleeve and the inner bearing member of the outer roller bearing, a bolt for securing said wheel on said sleeve and axle, said bolt extending through slots in said sleeve, whereby said wheel may be removed and said bearings may be adjusted, each independently of the other.

27. A car axle bearing comprising a journal box having an annular rib therein, an axle extending therethrough, conical roller bearings interposed between said journal box and said axle and bearing against said rib, said axle having a shouldered portion, a collar seated on said axle against said shouldered portion, the inner bearing member of the inner roller bearing abutting against said collar, a sleeve on the outer end of said axle, a nut for holding said sleeve on said axle, a wheel mounted on said sleeve, a collar between said sleeve and the inner bearing member of the outer roller bearing, a bolt for securing said wheel on said sleeve and axle, said bolt extending through slots in said sleeve, whereby said wheel may be removed and said bearings may be adjusted, each independently of the other.

28. In combination, a journal bearing, an axle rotatable therein, anti-friction means for said axle in said journal bearing, a wheel on said axle, and means for adjusting said anti-friction means through the wheel hub.

29. The combination with an axle and a wheel thereon, of an anti-friction rolling bearing for the axle at one side of the wheel, and means for adjusting said bearing operable from the other side of the wheel.

30. The combination with an axle and a wheel thereon, of an anti-friction rolling bearing for the axle at one side of the wheel, and means movable lengthwise of the axle extending through the wheel for adjusting said bearing from the other side of the wheel.

In witness whereof I have hereunto set my hand.

WARREN V. JOHNSON.